United States Patent

Kobayashi

[11] Patent Number: 5,841,936
[45] Date of Patent: Nov. 24, 1998

[54] PICTURE DATA RECORDING/REPRODUCING APPARATUS FOR PROVIDING DIVISIONAL PICTURE MANAGEMENT WITHOUT BOUNDARY DISTORTION

[75] Inventor: Toshiharu Kobayashi, Tokyo, Japan

[73] Assignee: Sony Corporation, Tokyo, Japan

[21] Appl. No.: 648,012

[22] PCT Filed: Oct. 4, 1995

[86] PCT No.: PCT/JP95/02032

§ 371 Date: Sep. 18, 1996

§ 102(e) Date: Sep. 18, 1996

[87] PCT Pub. No.: WO96/11546

PCT Pub. Date: Apr. 18, 1996

[30] Foreign Application Priority Data

Oct. 7, 1994 [JP] Japan .................................. 6-243841

[51] Int. Cl.[6] .............................. H04N 5/76; H04N 5/92
[52] U.S. Cl. ............................ 386/33; 386/40; 386/45; 386/112
[58] Field of Search ................. 386/109, 111–112, 386/125–126, 124.1, 33, 45, 40; 360/8, 32, 48, 40; 369/32, 124; 348/384, 390, 420; H04N 5/92, 5/76

[56] References Cited

U.S. PATENT DOCUMENTS

| 5,068,752 | 11/1991 | Tanaka et al. ........................ 386/104 |
|---|---|---|
| 5,191,436 | 3/1993 | Yonemitsu ............................ 386/112 |
| 5,341,250 | 8/1994 | Uchida et al. ......................... 386/112 |
| 5,349,384 | 9/1994 | Oguro .................................... 386/112 |
| 5,450,209 | 9/1995 | Niimura et al. ....................... 386/111 |
| 5,473,479 | 12/1995 | Takakura ............................... 386/124 |
| 5,477,397 | 12/1995 | Naimpally et al. ................... 386/123 |
| 5,543,928 | 8/1996 | Takakura ............................... 386/124 |
| 5,570,199 | 10/1996 | Tanaka et al. ........................ 386/111 |
| 5,574,566 | 11/1996 | Takakura et al. ..................... 386/112 |
| 5,602,685 | 2/1997 | Lee ....................................... 386/124 |
| 5,655,050 | 8/1997 | Yamamoto et al. .................. 386/124 |

FOREIGN PATENT DOCUMENTS

| 0115584 | 8/1984 | European Pat. Off. ......... H04N 1/00 |
|---|---|---|
| 3736220 | 5/1988 | Germany ......................... G06F 3/14 |
| 7-193809 | 7/1995 | Japan .............................. H04N 1/41 |

*Primary Examiner*—Thai Tran
*Attorney, Agent, or Firm*—Jay H. Maioli

[57] ABSTRACT

A picture data recording device which includes a picture data recording portion for storing one-picture input picture data, an encoding device for dividing the picture data into blocks and encoding the resulting blocks forming encoded picture data, a division device for dividing the one-picture input picture data into a plurality of partial picture regions each sized to be an integer number times a minimum sized block unit of a plurality of minimum sized block units, and further dividing the partial picture region based picture data into the plurality of minimum sized block units and supplying the plurality of resulting minimum sized blocks to the encoding unit, a recording device for recording the encoded picture data on a recording medium on a basis of said plurality of partial picture regions, and a control device.

7 Claims, 6 Drawing Sheets

PICTURE DATA RECORDING/ REPRODUCING APPARATUS FOR PROVIDING DIVISIONAL PICTURE MANAGEMENT WITHOUT BOUNDARY DISTORTION

TECHNICAL FIELD

This invention elates to a picture data recording device in which picture data for one picture is split into plural picture regions and compressed for being recorded on a recording medium, and a picture reproducing device in which the picture data are reproduced from a recording medium on which the picture data have been recorded by the data recording device. The present invention is applied to e.g. a picture filing system for recording encoded (compressed) still picture data on a disc-shaped recording medium, such as a magneto-optical disc.

BACKGROUND ART

There has so far been known a magneto-optical disc recording device for recording still picture data supplied from outside on a magneto-optical disc.

With the magneto-optical disc recording device, picture data supplied thereto are blocked on the encoding unit basis. The picture data are encoded on the block basis and supplied to a photomagnetic recording circuit. The photomagnetic recording circuit detects vacant areas of the magneto-optical disc under control of a central processing unit (CPU) which controls the photomagnetic recording circuit for recording the encoded still picture data in the vacant areas in terms of pre-set recording units, such as clusters, as recording units.

If, in the picture filing system recording still picture data, such as data of documents or maps, on a recording medium, each picture is split into plural partial picture regions for management purposes There has been known a method of divisionally managing a picture represented in multi-value data. such as a car navigation system, or a method of divisionally managing a non-compressed (non-encoded) picture, such as a map picture.

As the method for compressing still picture data, there is known a joint photographic coding experts group (JPEG) system which exploits the discrete cosine transform (DCT).

If, with a picture filing system exploiting the block-based non-reversible compression, accompanied by distortion, a full picture is divided into plural partial picture regions for management purposes, distortions are incurred at a boundary portion, thus deteriorating the picture quality of the synthesized picture.

In view of the above-described problems of the prior art, the present invention envisages to provide a picture data recording device and a picture data reproducing device whereby divisional picture management may be achieved without producing boundary distortion.

DISCLOSURE OF THE INVENTION

A picture data recording device according to the present invention includes picture data recording means for storing one-picture input picture data, encoding means for dividing the picture data into blocks and encoding the resulting blocks, division means for dividing the one-picture input picture data stored in said picture data storage means into a plurality of partial picture regions each sized to be an integer number times a minimum sized block unit in said encoding means, further dividing a partial picture region based picture data into said minimum sized block units and supplying the resulting minimum sized blocks to said encoding unit, recording means for recording encoded picture data encoded by said encoding means on the recording medium on the partial picture region basis, and control mans for controlling the operation of the above means.

With the picture data recording device of the present invention, the division means operates so that, when the size of a picture is indivisible by the size of the partial picture region, dummy pixels are used in order to change the shape of the picture to a picture shape divisible by the partial picture region, one-picture input picture data stored in the picture data storage means are divided into plural partial picture regions each sized to be an integer number times a minimum size block in the encoding means and wherein the partial picture region based picture data is divided in terms of the minimum size blocks as units and supplied in this form to the encoding means.

With the picture data recording device of the present invention, recording means is a magneto-optical disc run in rotation at a constant linear velocity, and encoded picture data encoded by the encoding means are recorded on the partial picture region basis on the magneto-optical disc.

With the picture data recording device of the present invention, the division means divides one-picture input picture data stored in the picture data storage means into plural partial picture regions each sized to be an integer number times a minimum size block composed of luminance data blocks and color difference data blocks of color picture data. The division means further divides the partial picture region based picture data in terms of the minimum size blocks as units for supplying the picture data in this form to the encoding means.

A picture data reproducing device for reproducing picture data from a recording medium having recorded thereon one-picture picture data which have been divided in plural partial picture regions each sized to be an integer number times a minimum encoding unit for encoding and which have been encoded on the partial picture region basis by block encoding, according to the present invention, includes reproducing means for reproducing the encoded picture data from the recording medium, expanding means for expanding the partial picture region based encoded picture data read out from the recording medium by the reproducing means, picture data storage means in which the picture data expanded by the expanding means are written so as to be read out as playback picture data, and control means for controlling the operation of the respective means.

With the picture data reproducing device of the present invention, the reproducing means reads out encoded picture data from a magneto-optical disc as a recording medium rotated at a constant linear velocity.

A picture data recording/reproducing device according to the present invention includes a recording system having picture data recording means for storing one-picture input picture data, encoding means for dividing the picture data into blocks and encoding the resulting blocks, division means for dividing the one-picture input picture data stored in the picture data storage means into a plurality of partial picture regions each sized to be an integer number times a minimum sized block unit in said encoding means, further dividing the partial picture region based picture data into the minimum sized block units and for supplying the resulting minimum sized blocks to the encoding unit, recording means for recording encoded picture data encoded by the encoding means on the recording medium in terms of the partial picture regions as units of recording; a reproducing system having reproducing means for reproducing the encoded picture data from the recording medium; expanding means for expanding the partial picture region based encoded picture data read out from the recording medium by the reproducing means; and picture data storage means in which the picture data expanded by the expanding means are written so as to be read out as playback picture data; and control means for controlling the operation of the recording system and the reproducing system.

With the picture data recording/reproducing device of the present invention, the division means in the recording system operates so that, when the size of a picture is indivisible by the size of the partial picture region, dummy pixels are used in order to change the shape of the picture to a picture shape divisible by the partial picture region, one-picture input picture data stored in the picture data storage means are divided into plural partial picture regions each sized to be an integer number times a minimum size block in the encoding means and the partial picture region based picture data is divided in terms of the minimum size blocks as units and supplied in this form to said encoding means.

With the picture data recording/reproducing device of the present invention, recording means is a magneto-optical disc run in rotation at a constant linear velocity and encoded picture data encoded by the encoding means are recorded/reproduced on the partial picture region basis on or from the magneto-optical disc.

BEST MODE FOR CARRYING OUT THE INVENTION

Figure 1:
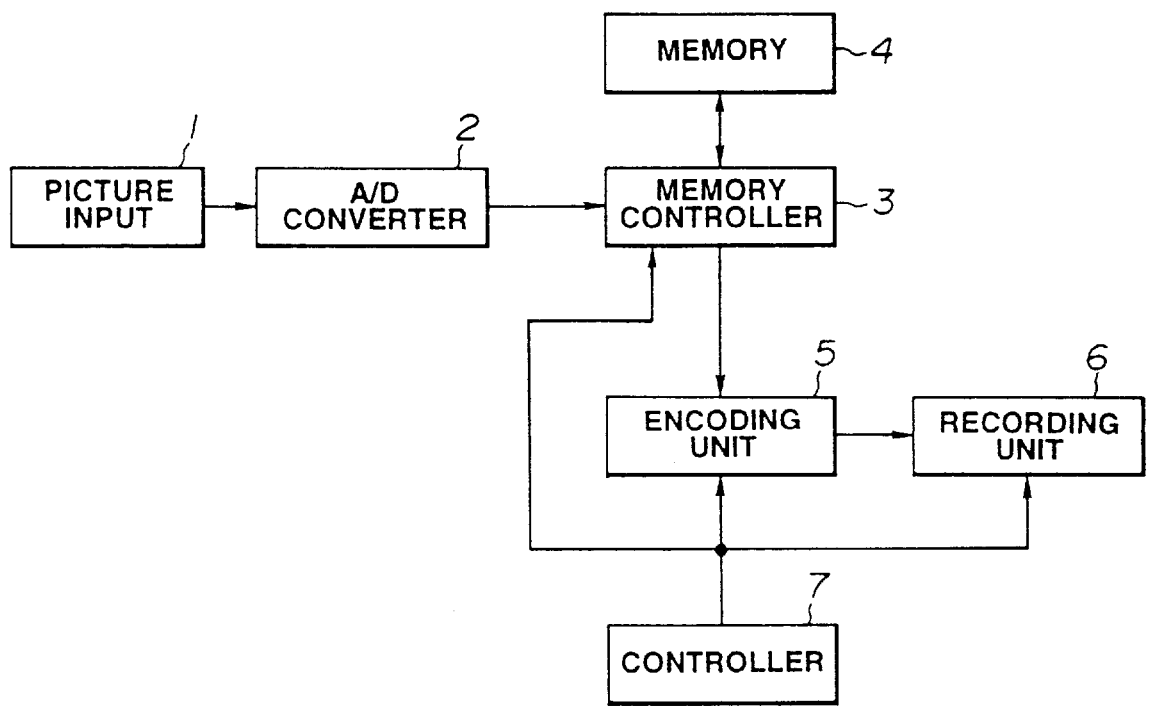
FIG. 1 is a block diagram showing a construction of a picture data recording device according to the present invention.

Referring to the drawings, preferred embodiments of the present invention will be explained in detail.

A picture data recording device according to the present invention is configured as shown in the block diagram of FIG. 1.

The picture data recording device shown in FIG. 1 includes a memory controller 3, connected to a picture input 1 via an A/D converter 2, a memory 4 connected to the memory controller 3, a recording unit 6 connected to the memory controller 3 via an encoding unit 5 and a controller 7 connected to the encoding unit 1 and to the recording unit 6.

The picture input 1 is comprised of a scanner or a video camera for reading a picture from e.g., a film or a photo, and furnishes an analog picture signal to the A/D converter 2. The A/D converter 2 digitizes the analog color picture signal and routes the digitized signal as input color picture data via the memory controller 3 to the memory 4.

The memory 4 stores one-picture input color picture data supplied thereto via A/D converter 2.

Figure 2A:
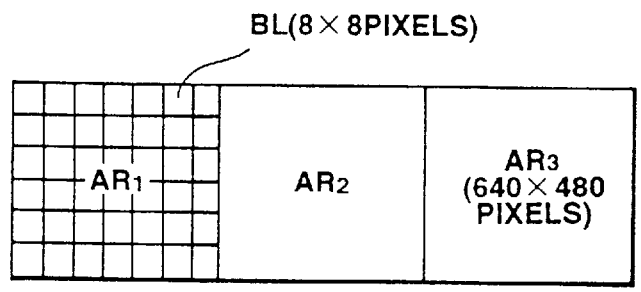
FIGS. 2A and 2B illustrate examples of picture division in the picture data recording device.
Figure 2B:
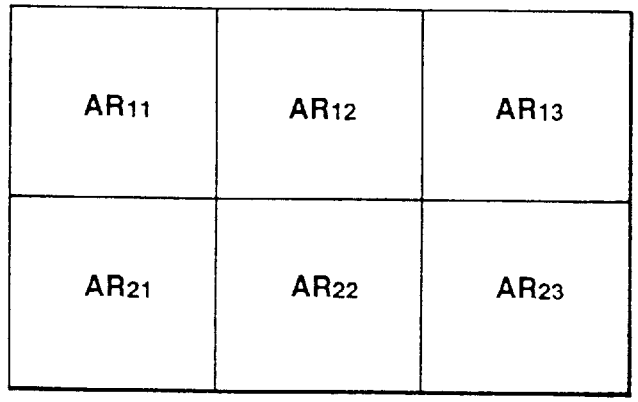

The memory controller 3 divides the one-picture input color picture data stored in the memory 4 into plural partial picture regions ARn, for example, into 3 partial picture regions as shown in FIG. 2A or 2×3 partial picture regions as shown in FIG. 2B, and sends the picture data to the encoding unit 5 on the partial picture basis. Each partial picture region is set to a size equal to an integer number times the size of a minimum 8×8 pixel encoding block BL comprising a luminance data block or a color difference data block, for example, to a size of 640×480 pixels. The memory controller 3 routes picture data to the encoding unit on the partial picture basis.

The encoding unit 5 encodes the picture data, routed thereto from the memory controller 6 on the partial picture region basis, in accordance with a block encoding system, such as JPEG system. The encoded partial picture region based color picture data are supplied to the recording unit 6 on the partial picture region basis.

The recording unit 6 records the encoded picture data on the magneto-optical disc which is driven at a constant linear velocity. The recording unit records the encoded color picture data on the partial picture region basis under control by the controller 7.

Figure 3:
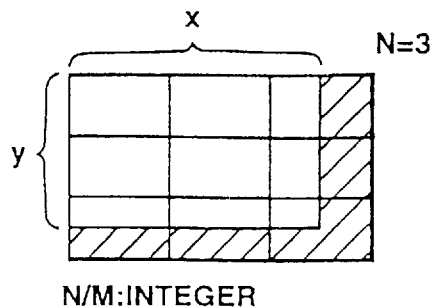
FIG. 3 shows the state in which, in the picture data recording device, the size of the full picture supplied to a memory cannot be divided by the size of the partial picture regions.
Figure 4:
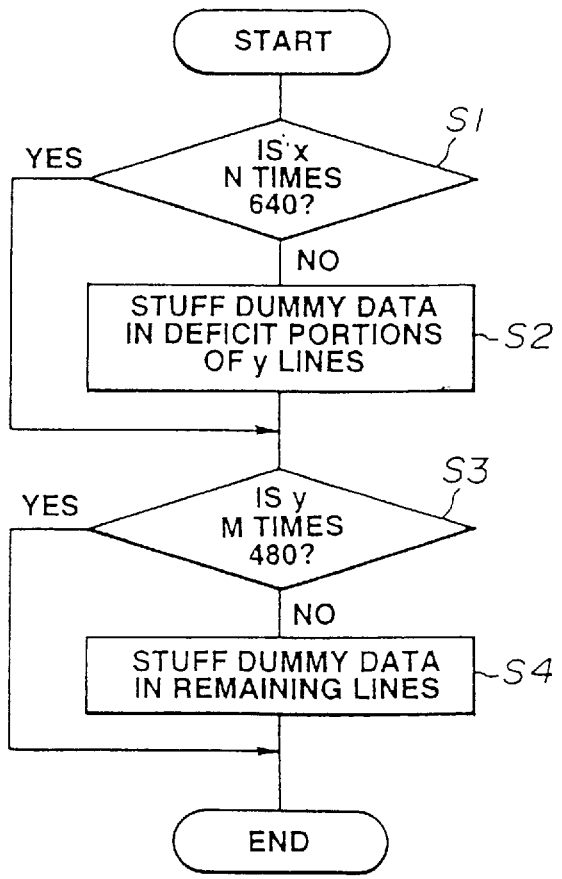
FIG. 4 is a flow chart illustrating the processing contents of the memory controller in case the size of the full picture supplied to a memory cannot be divided by the size of the partial picture regions.

If the size of the full picture (X×Y) supplied to the memory 4 is not divisible by the size of the partial picture region (640×480 pixels), the memory controller 3 sums dummy pixels to the full picture and the resulting picture is stored in the memory 4 and subsequently divided into partial picture regions, as shown in FIG. 3. The memory controller 3 routes the picture data to the encoding unit 5 on the partial picture region basis. The processing carried out at this time by the memory controller 3 is shown in the flowchart of FIG. 4.

The memory controller 3 judges at step S1 whether or not the number of pixels X in the horizontal direction of the full-picture size (X×Y) supplied to the memory 4 is equal to an integer number N times the number of pixels in the horizontal direction of the partial picture region comprised of 640 pixels.

If the result of judgment at step S1 is NO, that is if the number of pixels X in the horizontal direction is not an integer number times the number of pixels in the horizontal direction of the partial picture region, that is 640, the memory controller transfers to step S2. The memory controller 4 stuffs dummy data in deficit portions in the horizontal direction for all lines Y of the full picture supplied to the memory 4, before transferring to step S3. If the result of judgment at step S1 is YES, that is if the number of pixels X in the horizontal direction is an integer number times the number of pixels in the horizontal direction of the partial picture region, that is 640, the memory controller directly transfers to step S3.

At step S3, the memory controller judges whether or not the number of lines Y of the full picture supplied to the memory 4 is equal to the integer number N times the number of lines of the partial picture region, that is 480.

If the result of judgment at step S3 is NO, that is if the number of lines Y is not an integer number Y times the number of lines of the partial picture region or 480, the memory controller 4 transfers to step S4 for stuffing dummy data in deficit portions in each line of the full picture supplied to the memory 4 before terminating the sequence of operations of the flowchart. If the result of judgment at step S3 is YES, that is if the number of lines Y is an integer number N times the number of lines of the partial picture region or 480, the memory controller 4 directly terminates the sequence of operations of the flowchart.

With the above-described picture data recording device, in processing one-picture input color picture data stored in the memory 4, each full picture is divided into plural partial picture regions each sized to be equal to an integer number times the size of the minimum encoding block for encoding and picture data are encoded by block encoding on the partial picture region basis, so that the boundary of the encoding block coincides with the boundary of the partial picture region. The result is that no distortion is produced at a boundary of the partial picture region so that the picture data can be recorded on the recording medium on the partial picture region basis as encoded picture data obtained on areal division of the still picture data without producing distortions in the boundary of the partial picture regions.

Figure 5:
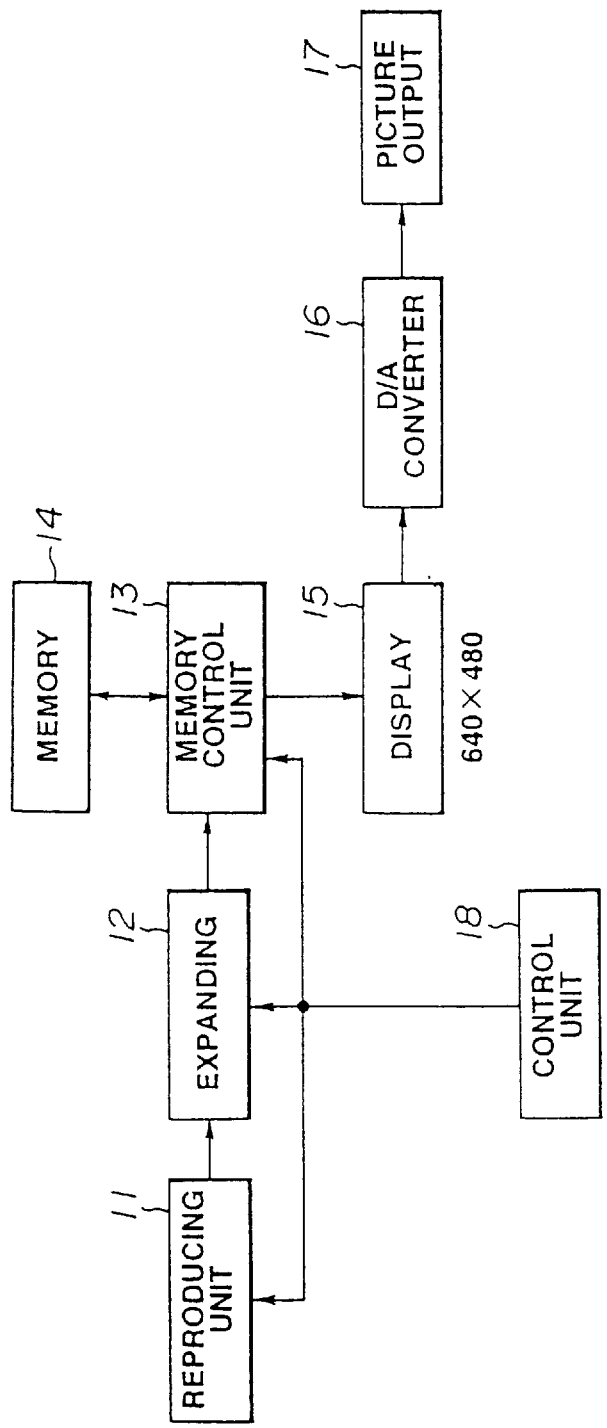
FIG. 5 is a block diagram showing the construction of a picture data reproducing device according to the present invention.

A picture data reproducing device according to the present invention is configured as shown for example in the block diagram of FIG. 5.

The picture data reproducing device, shown in FIG. 5, is designed for reproducing picture data from the magneto-optical disc on which the data has been recorded by the above-described picture data recording device. The device includes a memory control unit 13, connected to a reproducing unit 11 via an expanding unit 12, and a memory 14 connected to the memory control unit 13. The device also includes a picture output 17, connected to the memory control unit 13 via a display 15 and a D/A converter 16, and a control unit 18 connected to the reproducing unit 11, expanding unit 12 and to the memory control unit 13.

The reproducing unit 11 runs the magneto-optical disc in rotation at a constant linear velocity for data reproduction, and routes the encoded picture color data to the expanding unit 12 in terms of the partial picture regions reproduced from the magneto-optical disc as units.

The expanding unit 12 executes data decoding (expansion), which is a counterpart operation of the encoding (compression) executed by the picture data recording device, for generating playback color picture data, and transmits the playback color picture data on the partial picture region basis to the memory 14 via the memory controller 13.

On the other hand, the memory control unit 13 selectively reads out color picture data of the area to be displayed, such as an area of 640×480 pixels, and transmit the read-out color picture data to the display 16.

The D/A converter 16 converts the color picture data supplied from the display unit 15 into analog data which is supplied as output color picture signals via the picture output 17 to a monitoring unit, not shown.

Figure 6:
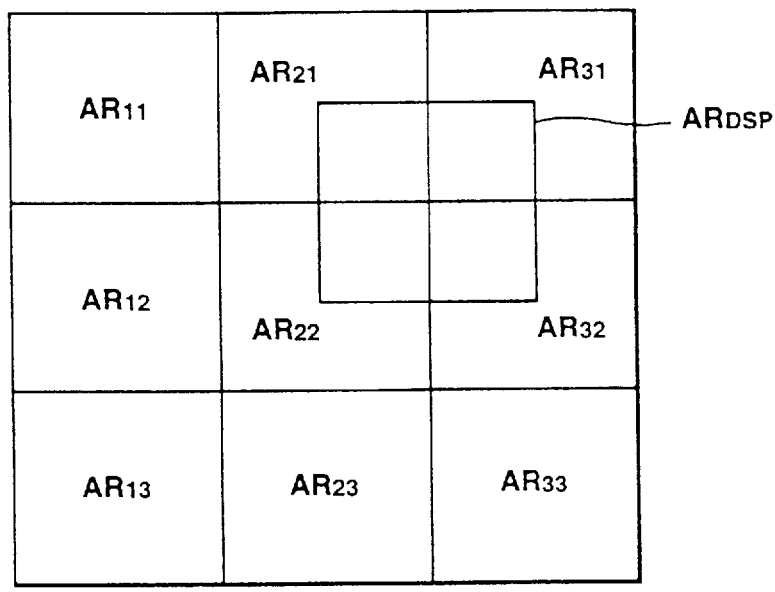
FIG. 6 illustrates picture data to be read out from the memory in the picture data reproducing device.

With the present color picture reproducing device, the memory 14 has a memory capacity of picture data from e.g., 3×3 partial picture regions $AR_{11}$ to $AR_{33}$, as shown in FIG. 6. The controller 18 manages control for supplying encoded color picture data corresponding to the partial picture regions required for display from the reproducing unit 11 to the expanding unit 12. The color picture data expanded by the expanding unit 12 is recorded in the memory 14 via the memory control unit 13 and the area to be displayed is selected by the memory control unit 13. If the area to be displayed $AR_{DSP}$ is outside the range of the memory 14, an optimum partial picture region is again read out by the reproducing unit 11 under control by the control unit 18 for executing a similar operation.

With the above-described picture data reproducing device, since the partial picture region based encoded color picture data, read out by the reproducing unit 11 from the recording medium, is expanded in association with compression by the above-described picture data recording device, and is outputted via the memory control unit 13 as reproduced picture data, the picture division may be managed without producing boundary distortion, such that scrolling can be performed at a higher speed by managing the picture division.

Figure 7:
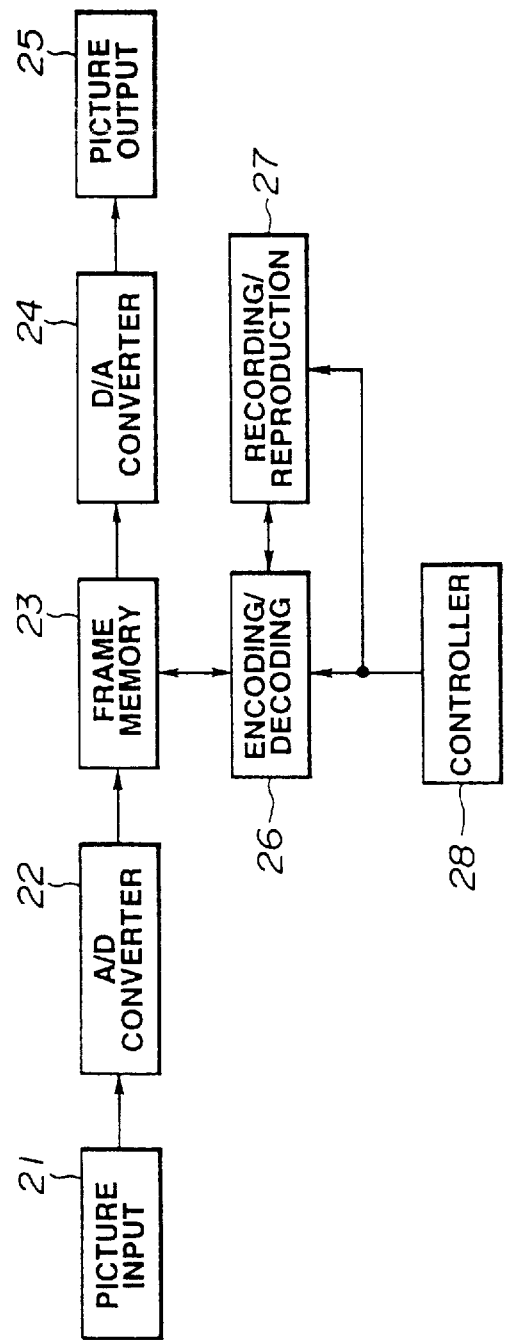
FIG. 7 is a block diagram showing the construction of the picture data recording/reproducing device according to the present invention.

A picture data recording/reproducing device according to the present invention is configured as shown in a block diagram shown in FIG. 7.

In the picture data recording/reproducing device, shown in FIG. 7, the present invention is applied to a picture filing system. The picture data recording/reproducing system includes a frame memory 23, connected from a picture input 21 via an A/D converter 22, a picture output 25 connected to the frame memory 23 via a D/A converter 24, a recording/reproducing unit 27 connected to the frame memory 3 via an encoding/decoding unit 26 and a controller 28 connected to the encoding/decoding unit 26 and to the recording/reproducing unit 27.

The picture input 21 is comprised of a scanner or a video camera for reading a picture from e.g., a film or a photo, and furnishes an analog picture signal to the A/D converter 22. The A/D converter 22 digitizes the analog color picture signal and routes the digitized signal as input color picture data to the frame memory 23.

For the recording mode, the frame memory 23 stores one-picture input color picture data entering the frame memory via the A/D converter 22. For the playback mode, the frame memory stores playback color picture data supplied via the encoding/decoding unit 26 from the recording/reproducing unit 27.

The D/A converter 24 converts the color picture data read out from the frame memory 23 into analog signals which are supplied as output color picture signals via the picture output 25 to a monitoring device, not shown.

For the recording mode, the encoding/decoding unit 26 divides the one-picture input color picture data stored in the frame memory 23 into plural partial picture regions on a memory. Each partial picture region is set to a size equal to an integer number times the size of a minimum size encoding block comprising a luminance data block or a color difference data block. The encoding/decoding unit encodes the partial picture region based picture data with block encoding such as with JPEG. The partial picture region based picture data thus encoded are supplied to the recording/reproducing unit 27. The encoding/decoding unit 26 decodes (expands) the partial picture region based playback color picture data reproduced from the recording medium by the recording/reproducing unit 27 by a counterpart operation to encoding, that is by decoding, for generating playback color picture data, and routes the partial picture region based playback color picture data to the frame memory 23.

The operating mode or the setting of the number of picture division for the encoding/decoding unit 26 is controlled by the controller 28.

The recording/reproducing unit 27, adapted for running the magneto-optical disc at a constant linear velocity for recording/reproduction, has its operating mode controlled by the controller 28 for recording/reproducing the encoded color picture data on the partial picture region basis.

With the above-described picture filing system, in processing one-picture input color picture data stored in the frame memory 23, during the recording mode, each full picture is divided into plural partial picture regions each sized to be equal to an integer number times the size of the minimum encoding block for encoding and partial picture region based picture data are encoded by block encoding. Thus the boundary of the encoding block coincides with the boundary of the partial picture region. The result is that no distortion is produced at a boundary of the partial picture region so that the picture data can be recorded on the recording medium as encoded picture data obtained on areal division of the still picture data, in terms of the partial picture regions as units, without producing distortions in the boundary of the partial picture regions. For the playback mode, since the partial picture region based encoded color picture data, read out by the reproducing unit 11 from the recording medium, is expanded in association with compression by the above-described picture data recording device, and is outputted via the memory control unit 13 as reproduced picture data, the picture division may be managed without producing boundary distortion, such that scrolling can be performed at a higher speed by managing the picture division.

I claim:

1. A picture data recording device comprising:

a picture data recording medium for storing one-picture input picture data;

encoding means for dividing picture data into blocks to form resulting blocks and encoding the resulting blocks to form encoded picture data;

division means for dividing the one-picture input picture data stored in said picture data storage means into a plurality of partial picture regions forming partial picture region based picture data each sized to be an integer number times a minimum sized block unit of a plurality of minimum sized block units in said encoding means, further dividing said partial picture region based picture data into said plurality of minimum sized block units forming a plurality of resulting minimum sized blocks and supplying the plurality of resulting minimum sized blocks to said encoding unit;

recording means for recording said encoded picture data encoded by said encoding means on said recording medium on a basis of said plurality of partial picture regions; and control means for controlling the operation of said encoding means, said division means, and said recording means, whereby said division means operates so that when a size of a picture is indivisible by a size of one of said plurality of partial picture regions dummy pixels are used to change a shape of the picture to a picture shape divisible by one of said plurality of partial picture regions, said one-picture input picture data stored in said picture data storage means are divided into said plurality of partial picture regions each sized to be an integer number times a minimum size block in said encoding means, and whereby one of said plurality of partial picture regions based picture data is divided into minimum size block units and supplied to said encoding means.

2. The picture data recording apparatus as claimed in claim 1 wherein said recording medium is a magneto-optical disc run in rotation at a constant linear velocity and wherein encoded picture data encoded by said encoding means are recorded on a basis of one of said plurality of partial picture regions on said magneto-optical disc.

3. The picture data recording apparatus as claimed in claim 1 wherein said division means divides said one-picture input picture data stored in said picture data storage means into said plurality of partial picture regions each sized to be an integer number times one of said plurality of minimum size blocks composed of luminance data blocks and color difference data blocks of color picture data, said division means further dividing partial picture region based picture data into said plurality of resulting minimum size block units for supplying the picture data to said encoding means.

4. A picture data reproducing device for reproducing picture data from a recording medium comprising:

reproducing means for reproducing the encoded picture data from said recording medium, wherein said recording medium has recorded thereon one-picture input picture data divided into a plurality of partial picture regions;

expanding means for expanding the partial picture region based encoded picture data read out from said recording medium by said reproducing means;

picture data storage means in which the picture data expanded by said expanding means are written so as to be read out as playback picture data; and control means for controlling an operation of said reproducing means, said expanding means, and said picture data storage means, whereby when a size of a picture has been indivisible by a size of one of said plurality of partial picture regions, dummy pixels are used to change a shape of the picture to a picture shape divisible by one of said plurality of partial picture regions, wherein each of said plurality of partial picture regions is sized to be an integer number times a minimum encoding unit for encoding and are encoded on a basis of one of a plurality of partial picture regions forming encoded picture data by block encoding.

5. The picture data reproducing device as claimed in claim 4 wherein said reproducing means reads out said encoded picture data from a magneto-optical disc forming said recording medium rotated at a constant linear velocity.

6. A picture data recording/reproducing device comprising:

a recording system having a picture data recording medium for storing one-picture input picture data;

encoding means for dividing the picture data into blocks forming a plurality of resulting blocks and encoding the plurality of resulting blocks forming encoded picture data;

division means for dividing the one-picture input picture data stored in said picture data storage means into a plurality of partial picture regions each sized to be an integer number times a minimum sized block unit and forming partial picture region based picture data in said encoding means, for further dividing the partial picture region based picture data into a plurality of minimum sized block units forming a plurality of resulting minimum sized blocks and for supplying the plurality of resulting minimum sized blocks to said encoding means; and recording means for recording said encoded picture data encoded by said encoding means on said recording medium on a basis of one of said partial picture regions;

a reproducing system having reproducing means for reproducing the encoded picture data from said recording medium;

expanding means for expanding the encoded picture data read out from said recording medium by said reproducing means; and picture data storage means in which the picture data expanded by said expanding means are written so as to be read out as playback picture data; and control means for controlling an operation of said recording system and said reproducing system, whereby said division means operates so that when a size of a picture is indivisible by a size of one of said plurality of partial picture regions dummy pixels are used to change a shape of the picture to a picture shape divisible by one of said plurality of partial picture regions, said one-picture input picture data stored in said picture data storage means are divided into said plurality of partial picture regions each sized to be an integer number times said minimum size block in said encoding means, and whereby the partial picture region based picture data is divided into said plurality of minimum size block units and supplied to said encoding means.

7. The picture data recording/reproducing device as claimed in claim 6 wherein said recording medium comprises a magneto-optical disc run in rotation at a constant linear velocity and wherein encoded picture data are recorded/reproduced on a basis of said plurality of partial picture regions on/from said magneto-optical disc.

* * * * *